(12) United States Patent
Sui et al.

(10) Patent No.: US 12,568,173 B2
(45) Date of Patent: Mar. 3, 2026

(54) MISSED INFORMATION ASSISTANT FOR ONLINE MEETING

(71) Applicant: International Business Machines Corporation, Armonk, NY (US)

(72) Inventors: Guang Han Sui, Beijing (CN); Peng Hui Jiang, Beijing (CN); Su Liu, Austin, TX (US); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 18/405,201

(22) Filed: Jan. 5, 2024

(65) Prior Publication Data

US 2025/0227181 A1     Jul. 10, 2025

(51) Int. Cl.
*G10L 15/22* (2006.01)
*G10L 15/05* (2013.01)
(Continued)

(52) U.S. Cl.
CPC ............. *H04M 3/533* (2013.01); *G10L 15/05* (2013.01); *G10L 15/1822* (2013.01); *G10L 15/22* (2013.01)

(58) Field of Classification Search
CPC ..... G10L 15/05; G10L 15/1822; G10L 15/22; G10L 15/26; G10L 17/00; G10L 17/22;
(Continued)

(56) References Cited

U.S. PATENT DOCUMENTS

| | | | |
|---|---|---|---|
| 8,171,416 B2 * | 5/2012 | Urquhart | H04L 51/04 715/753 |
| 8,209,181 B2 * | 6/2012 | Heckerman | G09B 19/00 725/87 |

(Continued)

FOREIGN PATENT DOCUMENTS

| | | |
|---|---|---|
| CN | 101789870 B | 5/2013 |
| CN | 107911646 B | 9/2020 |

OTHER PUBLICATIONS

Disclosed Anonymously, "A System to Detect Audio Inconsistency in Online Meetings", An IP.com Prior Art Database Technical Disclosure, IP.com No. IPCOM000265415D, IP.com Electronic Publication Date: Apr. 8, 2021, 4 pages.

(Continued)

*Primary Examiner* — Vijay B Chawan
(74) *Attorney, Agent, or Firm* — Anthony M. Pallone

(57) ABSTRACT

According to one embodiment, a method, computer system, and computer program product for mitigating missed information during an online meeting is provided. The embodiment may include recording, at a computing device of a speaker participant of the online meeting, utterances of the speaker as voice messages during the online meeting. The embodiment may include adding a unique tag to each voice message of the voice messages and transmitting the voice messages to respective computing devices of listener participants of the online meeting. The embodiment may include receiving, at the computing device of the speaker participant, one or more response tags. Based on the received response tags, the embodiment may include identifying details of one or more transmitted voice messages missed by one or more of the respective computing devices of the listener participants and notifying identified respective computing devices of the listener participants of their respectively missed voice messages.

17 Claims, 2 Drawing Sheets

(51) Int. Cl.
  *G10L 15/18* (2013.01)
  *H04M 3/533* (2006.01)

(58) Field of Classification Search
  CPC ..... G10L 17/26; H04L 12/1831; H04L 51/04;
        H04L 12/1827; H04L 65/403; H04L
                                        65/1083
  USPC ........................................................ 704/201
  See application file for complete search history.

(56) References Cited

U.S. PATENT DOCUMENTS

| | | | | | |
|---|---|---|---|---|---|
| 9,165,290 | B2 * | 10/2015 | Wessling | ............ | H04L 12/1827 |
| 10,839,584 | B2 | 11/2020 | Inagawa et al. | | |
| 2006/0239212 | A1 * | 10/2006 | Pirzada | ................... | H04M 3/56 |
| | | | | | 370/260 |
| 2007/0121817 | A1 * | 5/2007 | Cai | ....................... | H04M 3/493 |
| | | | | | 379/88.13 |
| 2016/0284354 | A1 * | 9/2016 | Chen | ........................ | H04N 7/15 |
| 2016/0285929 | A1 * | 9/2016 | Oganezov | ............. | H04L 65/765 |
| 2017/0208105 | A1 * | 7/2017 | Katekar | ............... | H04L 12/1827 |
| 2017/0278518 | A1 * | 9/2017 | Kashtan | ................ | G10L 19/018 |
| 2017/0357915 | A1 * | 12/2017 | Holmes | ................. | G06F 3/0484 |
| 2017/0357917 | A1 * | 12/2017 | Holmes | ........... | G06Q 10/06314 |
| 2019/0028667 | A1 * | 1/2019 | Faulkner | ................ | H04N 7/155 |
| 2019/0341059 | A1 * | 11/2019 | Ferreira Moreno | .... | G10L 15/26 |
| 2020/0226501 | A1 * | 7/2020 | Holmes | ............. | G06Q 10/1093 |
| 2020/0242785 | A1 | 7/2020 | Sato | | |
| 2023/0412852 | A1 * | 12/2023 | Lei | .......................... | A63F 13/87 |
| 2025/0071040 | A1 * | 2/2025 | Wang | ..................... | G16Y 40/50 |
| 2025/0227181 | A1 * | 7/2025 | Sui | .......................... | G10L 15/05 |

OTHER PUBLICATIONS

Disclosed Anonymously, "Online meeting assistance", An IP.com Prior Art Database Technical Disclosure, IP.com No. IPCOM000252378D, IP.com Electronic Publication Date: Jan. 5, 2018, 5 pages.

* cited by examiner

100

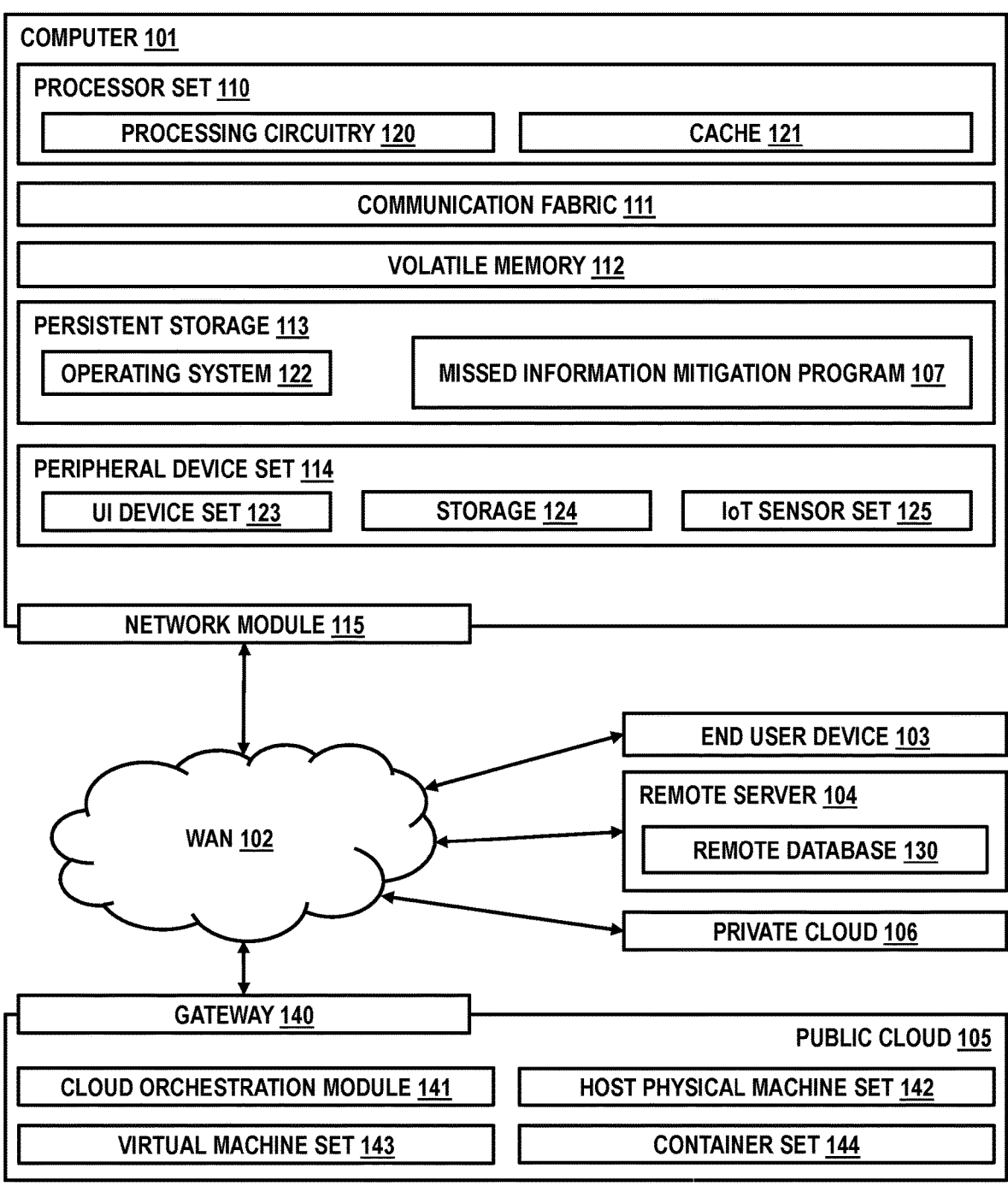

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122          MISSED INFORMATION MITIGATION PROGRAM 107

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

*Figure 1*

MISSED INFORMATION ASSISTANT FOR ONLINE MEETING

BACKGROUND

The present invention relates generally to the field of computing, and more particularly to web conferencing.

Web conferencing refers to a type of online service that allows individuals or groups to meet and collaborate in real-time using the internet. In general, a web conference (also known as an online meeting) is made possible through the use of internet protocol technologies such as Transmission Control Protocol and the Internet Protocol (TCP/IP). It may involve audio and video communication along with various collaborative features including chat and messaging, screen sharing, and document sharing. Web conferencing has become increasingly popular and as a result has transformed the way enterprises and individuals communicate and collaborate. Factors contributing to the widespread adoption of web conferencing include global accessibility, cost-effectiveness, time efficiency, and technology advancements. For example, web conferences mitigate geographical barriers, allowing people from around the world to connect in real-time. This may be especially crucial for businesses with employees located in different regions. Implementation of web conferences may also reduce travel expenses (e.g., flights, hotels, car rentals) incurred by organizations and save time by increasing productivity and efficiency of meetings. Furthermore, improved video conferencing technology, high-speed internet, and better audiovisual equipment may contribute to a seamless online meeting experience.

SUMMARY

According to one embodiment, a method, computer system, and computer program product for mitigating missed information during an online meeting is provided. The embodiment may include recording, at a computing device of a speaker participant of the online meeting, utterances of the speaker participant as voice messages during the online meeting. The embodiment may include adding a unique tag to each voice message of the voice messages and transmitting the voice messages to respective computing devices of listener participants of the online meeting. The embodiment may include receiving, at the computing device of the speaker participant, one or more response tags from the respective computing devices of the listener participants. Based on the received response tags, the embodiment may include identifying details of one or more transmitted voice messages missed by one or more of the respective computing devices of the listener participants. The details identify those respective computing devices of the listener participants having missed voice messages. The embodiment may include notifying identified respective computing devices of the listener participants of their respectively missed voice messages.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computer environment according to at least one embodiment.

DETAILED DESCRIPTION

Figure 2:
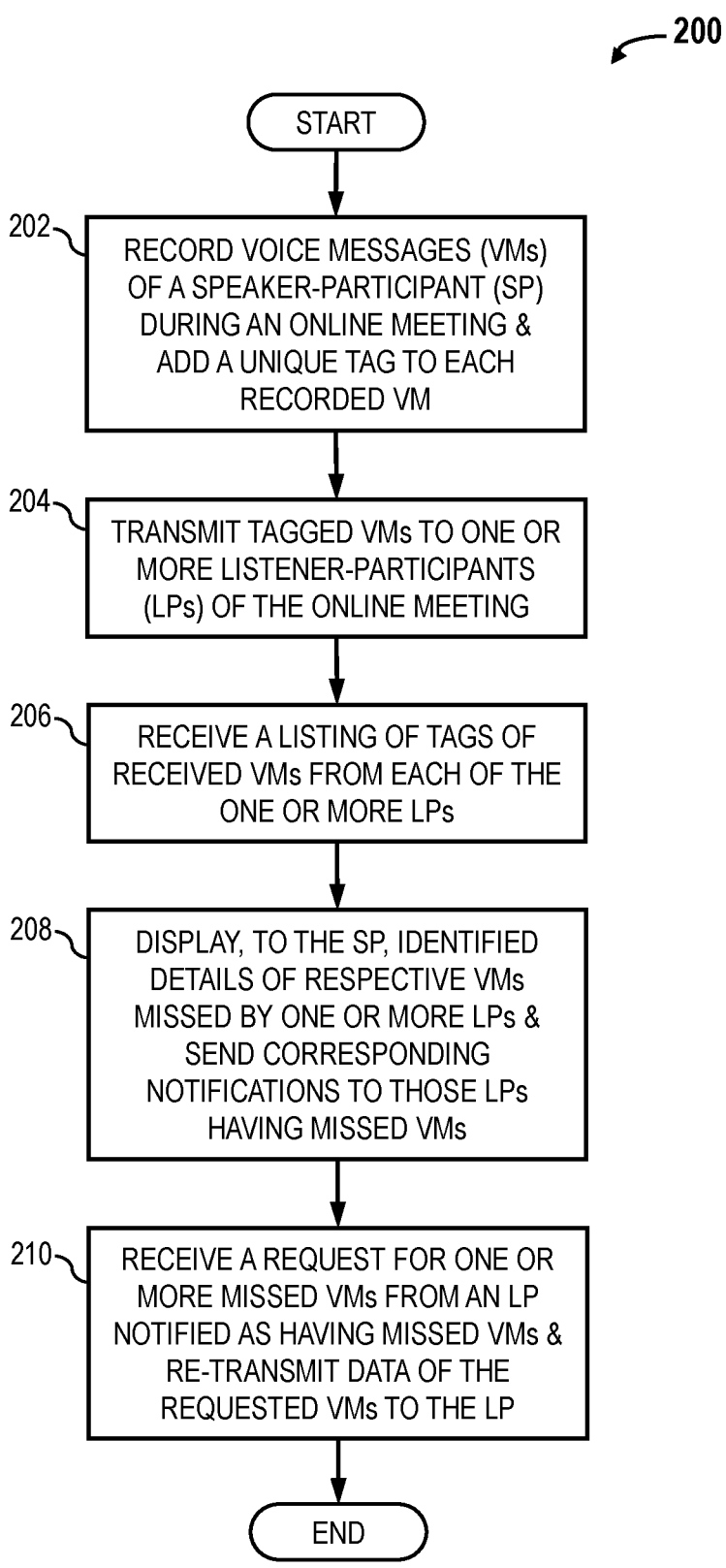
FIG. 2 illustrates an operational flowchart for mitigating missed voice messages during an online meeting via a missed information mitigation process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to web conferencing. The following described exemplary embodiments provide a system, method, and program product to, among other things, provide a listener with missed information of a speaker during an online meeting. Therefore, the present embodiment has the capacity to improve the technical field of web conferencing by dynamically capturing voice messages of a speaker during an online meeting and confirming that the captured voice messages are received by a listener during the online meeting, thus ensuring, despite the existence of an unstable network facilitating the online meeting, the listener receives information of the speaker and mitigating missed information resulting from network connection issues during the online meeting.

As previously described, web conferencing refers to a type of online service that allows individuals or groups to meet and collaborate in real-time using the internet. In general, a web conference (also known as an online meeting) is made possible through the use of internet protocol technologies such as TCP/IP. It may involve audio and video communication along with various collaborative features including chat and messaging, screen sharing, and document sharing. Web conferencing has become increasingly popular and as a result has transformed the way enterprises and individuals communicate and collaborate. Factors contributing to the widespread adoption of web conferencing include global accessibility, cost-effectiveness, time efficiency, and technology advancements. For example, web conferences mitigate geographical barriers, allowing people from around the world to connect in real-time. This may be especially crucial for businesses with employees located in different regions. Implementation of web conferences may also reduce travel expenses (e.g., flights, hotels, car rentals) incurred by organizations and save time by increasing productivity and efficiency of meetings. Furthermore, improved video conferencing technology, high-speed internet, and better audiovisual equipment may contribute to a seamless online meeting experience.

As a result of their convenience and accessibility, web conferences have become integral to the way enterprises and individuals work and communicate. Nonetheless, while web conferencing may be a valuable tool for virtual collaboration, it may present technical challenges associated with its use. For example, technical glitches within the web conferencing platform (e.g., freezing screens or dropped connections) may impede the smooth flow of the web meeting. Also, participants of the online meeting may experience issues with unstable or slow internet connections which may lead to disruptions in audio/video quality and missed information (e.g., missed messages of a speaker). It may therefore be imperative to have a missed information mitigation system in place to capture utterances of a speaker during an online meeting and provide, in near real-time, a listener with information of speaker utterances which were missed during the online meeting. Thus, embodiments of the present invention may be advantageous to, among other things, utilize sentence boundary detection (SBD) and/or other natural language processing (NLP) techniques to parse spoken language (i.e., utterances) of a speaker participant during an on online meeting into sentence-like units, record voice messages (i.e., audio recordings) of a speaker's parsed utterances during an online meeting, assign a unique tag to every recorded voice message of a speaker participant of an online meeting, perform speech-to-text processing of each uniquely tagged voice message of a speaker participant of an online meeting, transmit every tagged voice message of a speaker participant to one or more listener participants of an online meeting, receive from one or more listener participants of an online meeting listings of tags of received voice messages of a speaker participant, display, to a speaker participant, respective details of voice messages missed by one or more listener participants of an online meeting, notify listener participants of an online meeting of their respectively missed voice messages of a speaker participant, receive requests for missed information (i.e., one or more voice messages) of a speaker participant from one or more listener participants of an online meeting, transmit audio and/or text data of missed information of a speaker participant to one or more requesting listener participants of an online meeting, enable a listener participant of an online meeting to enter a "pause" mode whereby the listener participant may temporarily leave the online meeting while received voice messages of a speaker participant are recorded, and playback voice messages of a speaker participant recorded during a "pause" mode to a listener participant upon their canceling of the "pause" mode. The present invention does not require that all advantages need to be incorporated into every embodiment of the invention.

According to at least one embodiment, during an online meeting, voice messages of a speaker participant may be recorded and associated with a unique tag. Further, each uniquely tagged voice message recording may be translated into a respective text message. According to at least one embodiment, each tagged voice message recording of the speaker participant may be transmitted from a device of the speaker participant to devices of one or more listener participants of the online meeting. According to at least one embodiment, the one or more listener participants may transmit respectively received tags back to the device of the speaker participant. The speaker participant may identify details of any voice messages individually missed by the one or more listener participants based on the tags received at the device of the speaker participant. The speaker participant may also notify the one or more listener participants of their respectively missed voice messages. According to at least one embodiment, the speaker participant may re-transmit a missed voice message, and/or its text translation, upon request from a listener participant of the one or more listener participants.

According to at least one other embodiment, a listener participant of the online meeting may enter a "pause" mode whereby the listener participant may temporarily leave the online meeting while a device of the listener participant is instructed to record received voice messages of the speaker participant. The device of the listener participant may be further instructed to playback the voice messages of the speaker participant recorded during the "pause" mode upon cancelation of the "pause" mode by the listener participant.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to provide missed information to a listener participant of an online meeting.

Referring to FIG. 1, an exemplary computing environment 100 is depicted, according to at least one embodiment. Computing environment 100 contains an example of an environment for the execution of at least some of the computer code involved in performing the inventive methods, such as missed information mitigation (MIM) program 107. In addition to MIM program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and MIM program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program, such as MIM program 107, and accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in MIM program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in MIM program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an edge device capable of connecting to computer 101 via WAN 102 and network module 115 and capable of receiving instructions from MIM program 107.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The MIM program 107 may be a program capable of utilizing sentence boundary detection (SBD) and/or other natural language processing (NLP) techniques to parse spoken language (i.e., utterances) of a speaker participant during an on online meeting into sentence-like units, recording voice messages (i.e., audio recordings) of a speaker's parsed utterances during an online meeting, assigning a unique tag to every recorded voice message of a speaker participant of an online meeting, performing speech-to-text processing of each uniquely tagged voice message of a speaker participant of an online meeting, transmitting every tagged voice message of a speaker participant to one or more listener participants of an online meeting, receiving from one or more listener participants of an online meeting listings of tags of received voice messages of a speaker participant, identifying one or more listener participants of an online meeting having missed one or more voice messages of a speaker participant, displaying, to a speaker participant, details of respective voice messages missed by one or more listener participants of an online meeting, notifying listener participants of an online meeting of their respectively missed voice messages of a speaker participant, receiving requests for missed information (i.e., one or more voice messages) of a speaker participant from one or more listener participants of an online meeting, transmitting audio and/or text data of missed information of a speaker participant to one or more requesting listener participants of an online meeting, enabling a listener participant of an online meeting to enter a "pause" mode during which the listener participant may temporarily leave the online meeting while received voice messages of a speaker participant are recorded, and playing back voice messages of a speaker participant recorded during a "pause" mode to a listener participant upon their canceling of the "pause" mode. In at least one embodiment, MIM program 107 may require a user to opt-in to system usage upon opening or installation of MIM program 107. Despite depiction in computer 101, MIM program 107 may be stored in and/or executed by, individually or in any combination, end user device 103, remote server 104, public cloud 105, and private cloud 106 so that functionality may be separated among the devices. The missed information mitigation method is explained in further detail below with respect to FIG. 2.

Referring now to FIG. 2, an operational flowchart for mitigating missed voice messages during an online meeting via a missed information mitigation process 200 is depicted according to at least one embodiment. At 202, an instance of MIM program 107, which is executing on a computing device of a speaker participant of an online meeting (i.e., a speaker-side instance of MIM program 107), records spoken utterances of the speaker participant as voice messages during the online meeting. According to at least one embodiment, in recording voice messages of the speaker participant, the speaker-side instance of MIM program 107 may utilize known sentence boundary detection (SBD) techniques, and/or other known natural language processing (NLP) techniques, to parse spoken language (i.e., utterances) of the speaker participant made during the on online meeting into sentence-like units. Each sentence-like unit may then be recorded as an individual voice message (e.g., an audio clip) of the speaker participant. Further, each voice message of the speaker participant may be simultaneously translated, by the speaker-side instance of MIM program 107, into its corresponding text via speech-to-text processing. According to at least one embodiment, the parsing of the speaker participant's spoken language into individually recorded voice messages may be performed in real-time as the speaker participant talks during the online meeting. According to another embodiment, the parsing may be performed periodically (e.g., every x-interval of seconds) as the speaker participant talks during the online meeting. In such an embodiment, the speaker-side instance of MIM program 107 may maintain, in a memory buffer, a last x-interval (e.g., a last 30 seconds) of audio of the speaker participant.

Furthermore, at 202, the speaker-side instance of MIM program 107 concurrently adds and/or associates a unique tag to each recorded voice message of the speaker participant. According to at least one embodiment, the unique tag associated with a recorded voice message may include a timestamp at which the voice message was parsed or recorded. According to at least one other embodiment, the unique tag associated with a recorded voice message may include a hash value, computed by the speaker-side instance of MIM program 107, of the text corresponding to the voice message. In embodiments of the invention, a set of recorded voice messages, along with their respectively associated unique tags and corresponding texts, of the speaker participant may be stored within storage 124 and/or remote database 130 and may be accessible by instances of MIM program 107.

Next, at 204, the speaker-side instance of MIM program 107 transmits recorded voice messages of the speaker participant, along with their respectively associated unique tags and corresponding texts, to one or more instances of MIM program 107 which are executing on respective computing devices of one or more listener participants of the online meeting (i.e., one or more listener-side instances of MIM program 107). For example, where participants of the online meeting include one speaker participant and three listener participants, the speaker-side instance of MIM program 107 may transmit every recorded voice message (i.e., audio clip) of the speaker, along with their respectively associated unique tags and corresponding texts, to the three listener-side instances of MIM program 107 executing on respective computing devices of the listener participants. According to at least one embodiment, the speaker-side instance of MIM program 107 may transmit, to one or more listener-side instances of MIM program 107, voice messages (and their respectively associated unique tags and corresponding texts) of the speaker participant as they are recorded during the online meeting. According to at least one other embodiment, the speaker-side instance of MIM program 107 may periodically transmit (e.g., every x-interval of seconds) a set of recorded voice messages (each with an associated tag and text) to one or more listener-side instances of MIM program 107 during the online meeting.

At 206, the speaker-side instance of MIM program 107 receives a listing of one or more tags of received voice messages from each of the one or more listener-side instances of MIM program 107. In continuance of the example above where the speaker-side instance of MIM program 107 transmitted recorded voice messages of the speaker participant to the three listener-side instances of MIM program 107, the speaker-side instance of MIM program 107 may, in return, receive a separate list from each of the three listener-side instances of MIM program 107 which specifies the unique tags associated with recorded voice messages which were respectively received by the three listener-side instances. Alternatively, the speaker-side instance of MIM program 107 may receive, from each of the three listener-side instances of MIM program 107, the tags which are associated with voice messages which were respectively received. These response tags may be sent to the speaker-side instance of MIM program 107 upon receipt of their associated voice messages. A received list of tags, or received tags, from a listener-side instance of MIM program 107 may serve as a record of the respectively associated voice messages which were actually received by that listener-side instance of MIM program 107. As such, if a listener-side instance of MIM program 107 does not receive one or more particular voice messages (e.g., an unstable network connection prevented receipt of a voice message), the speaker-side instance of MIM program 107 may not receive the one or more tags respectively associated with those missed voice messages from that listener-side instance of MIM program 107. According to at least one embodiment, each tag, or each list of tags, received by the speaker-side instance of MIM program 107 may include a marker which identifies the listener participant, and/or the listener-side instance of MIM program 107, from which the tag or list of tags is received. For example, each tag (or each list of tags) may include a listener participant name and/or an identifier (ID) of a particular listener-side instance of MIM program 107. As another example, each tag (or each list of tags) may include a unique network link (e.g., an Internet Protocol address) associated with the computing device on which a listener-side instance of MIM program 107 is executing.

Next, at 208, the speaker-side instance of MIM program 107 identifies and displays, via a screen of the computing device of the speaker participant, details of one or more voice messages which were respectively missed (i.e., not received) by the one or more listener-side instances of MIM program 107 during the online meeting. As noted above, received tags (i.e., response tags) from a listener-side instance of MIM program 107 may serve as a confirmation of the respectively associated voice messages which were actually received by that listener-side instance of MIM program 107. Consequently, according to at least one embodiment, one or more missed voice messages of a listener-side instance of MIM program 107 may be identified by a lack of receipt of one or more response tags respectively associated with known voice messages transmitted to the one or more listener-side instances of MIM program 107 at 204. As an illustration of identifying missed voice messages and in furtherance of the example above, assume that the speaker-side instance of MIM program 107 transmitted two voice messages (e.g., vm1 & vm2), and their associated tags, to each of the three listener-side instances of MIM program 107 (e.g., lis_instA, lis_instB, & lis_instC). Further, assume that lis_instA and lis_instB each received vm1 and vm2 and each transmitted respective response tags, with markers, for the received voice messages to the speaker-side instance of MIM program 107. However, due to some network connectivity issue, lis_instC received vm1 but did not receive vm2 and therefore transmitted only the response tag, with marker, for vm1 to the speaker-side instance of MIM program 107. Having not received a response tag for vm2 from lis_instC, the speaker-side instance of MIM program 107 may identify that lis_instC missed (i.e., did not receive) vm2 and display details of the missed voice message to the speaker participant. According to at least one embodiment, details of one or more missed voice messages may be displayed in a table which provides, for each missed voice message, text of the voice message, its associated unique tag, and identification of the listener participant(s), and/or the listener-side instance(s) of MIM program 107, who missed the voice message of the speaker participant.

Also, at 208, the speaker-side instance of MIM program 107 sends, during the online meeting, a notification to one or more listener-side instances of MIM program 107 identified as having one or more missed voice messages. According to at least one embodiment, the notification may simply inform a listener-side instance of MIM program 107 that it has one or more missed voice messages, or the notification may further include details of the missed voice messages such as their respectively associated unique tags (e.g., their time-stamps). For instance, in the example above, the speaker-side instance of MIM program 107 may send a notification to a computing device of lis_instC which informs lis_instC that it missed vm2 having an associated tag comprising its timestamp.

At 210, in response to a request for one or more missed voice messages received from a listener-side instance of MIM program 107 which was notified, at 208, as having one or more missed voice messages of the speaker participant, the speaker-side instance of MIM program 107 re-transmits data of the requested one or more missed voice messages to the requesting listener-side instance of MIM program 107. According to at least one embodiment, re-transmitted data of a requested missed voice message may include a requested recorded audio clip of the missed voice message, and/or a requested text translation of the missed voice message, along with its associated unique tag. In conclusion of the example above, having received a notification from the speaker-side instance of MIM program 107 that it has missed vm2, lis_instC may request voice and text data of vm2 from the speaker-side instance of MIM program 107. Accordingly, the speaker-side instance of MIM program 107 may re-transmit the recorded audio clip and corresponding text translation of vm2, along with its associated unique tag, to lis_instC. In doing so, disclosed embodiments mitigate missed information resulting from network connection issues during the online meeting.

It may be appreciated that FIG. 2 provides only an illustration of one implementation and does not imply any limitations with regard to how different embodiments may be implemented. Many modifications to the depicted environments may be made based on design and implementation requirements.

For instance, according to at least one further embodiment, a listener-side instance of MIM program 107 may enable a listener participant to enter a "pause" mode whereby the listener participant may temporarily leave the online meeting while the listener-side instance of MIM program 107, via its executing computing device, records audio of received voice messages of the speaker participant and performs speech-to-text processing of the recorded audio. Upon cancelation of the "pause" mode by the listener participant, the listener-side instance of MIM program 107 may cause the device of the listener participant to playback the recorded audio of the received voice messages and/or display the corresponding text translations of the received voice messages.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

recording, at a computing device of a speaker participant of an online meeting, utterances of the speaker participant as recorded voice messages during the online meeting;

adding a unique tag to each recorded voice message of the recorded voice messages;

transmitting the recorded voice messages, with their respective unique tags, to respective computing devices of listener participants of the online meeting;

receiving, at the computing device of the speaker participant, one or more response tags from the respective computing devices of the listener participants, wherein a response tag comprises a unique tag of a recorded voice message, of the transmitted recorded voice messages, received at a computing device of a listener participant and a marker which identifies the computing device of the listener participant from which the response tag is sent;

based on the received response tags, identifying details of one or more transmitted recorded voice messages missed by one or more of the respective computing devices of the listener participants, wherein the details identify those respective computing devices of the listener participants having missed recorded voice messages; and notifying identified respective computing devices of the listener participants of their respectively missed recorded voice messages.

2. The method of claim 1, wherein recording utterances of the speaker participant as recorded voice messages during the online meeting comprises:

utilizing sentence boundary detection techniques to parse language of the speaker participant spoken during the online meeting into sentence-like units; and recording each sentence-like unit as an individual audio clip.

3. The method of claim 1, wherein a unique tag of a recorded voice message comprises a timestamp at which the voice message was recorded.

4. The method of claim 1, wherein identifying the details of one or more transmitted recorded voice messages missed by one or more of the respective computing devices of the listener participants comprises identifying a lack of receipt of one or more response tags respectively associated with the recorded voice messages transmitted to the respective computing devices of the listener participants.

5. The method of claim 1, further comprising:

in response to notifying an identified computing device of a listener participant of its missed recorded voice messages, receiving a request from the identified computing device of the listener participant for re-transmitting of a missed recorded voice message; and re-transmitting, via the computing device of the speaker participant, data of the missed recorded voice message to the identified computing device of the listener participant.

6. The method of claim 1, further comprising:

displaying, via a screen of the computing device of a speaker participant, the identified details of the one or more transmitted recorded voice messages missed by the one or more respective computing devices of the listener participants during the online meeting, wherein the identified details comprise, for each missed recorded voice message, text of the recorded voice message, an associated unique tag of the recorded voice message, and identification of the computing device of the listener participant that missed the recorded voice message.

7. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

recording, at a computing device of a speaker participant of an online meeting, utterances of the speaker participant as recorded voice messages during the online meeting;

adding a unique tag to each recorded voice message of the recorded voice messages;

transmitting the recorded voice messages, with their respective unique tags, to respective computing devices of listener participants of the online meeting;

receiving, at the computing device of the speaker participant, one or more response tags from the respective computing devices of the listener participants, wherein a response tag comprises a unique tag of a recorded voice message, of the transmitted recorded voice messages, received at a computing device of a listener participant and a marker which identifies the computing device of the listener participant from which the response tag is sent;

based on the received response tags, identifying details of one or more transmitted recorded voice messages missed by one or more of the respective computing devices of the listener participants, wherein the details identify those respective computing devices of the listener participants having missed recorded voice messages; and notifying identified respective computing devices of the listener participants of their respectively missed recorded voice messages.

8. The computer system of claim 7, wherein recording utterances of the speaker participant as recorded voice messages during the online meeting comprises:

utilizing sentence boundary detection techniques to parse language of the speaker participant spoken during the online meeting into sentence-like units; and recording each sentence-like unit as an individual audio clip.

9. The computer system of claim 7, wherein a unique tag of a recorded voice message comprises a timestamp at which the voice message was recorded.

10. The computer system of claim 7, wherein identifying the details of one or more transmitted recorded voice messages missed by one or more of the respective computing devices of the listener participants comprises identifying a lack of receipt of one or more response tags respectively associated with the recorded voice messages transmitted to the respective computing devices of the listener participants.

11. The computer system of claim 7, further comprising:

in response to notifying an identified computing device of a listener participant of its missed recorded voice messages, receiving a request from the identified computing device of the listener participant for re-transmitting of a missed recorded voice message; and re-transmitting, via the computing device of the speaker participant, data of the missed recorded voice message to the identified computing device of the listener participant.

12. The computer system of claim 7, further comprising:

displaying, via a screen of the computing device of a speaker participant, the identified details of the one or more transmitted recorded voice messages missed by the one or more respective computing devices of the listener participants during the online meeting, wherein the identified details comprise, for each missed recorded voice message, text of the recorded voice message, an associated unique tag of the recorded voice message, and identification of the computing device of the listener participant that missed the recorded voice message.

13. A computer program product, the computer program product comprising:

one or more computer-readable tangible storage medium and program instructions stored on at least one of the one or more tangible storage medium, the program instructions executable by a processor capable of performing a method, the method comprising:

recording, at a computing device of a speaker participant of an online meeting, utterances of the speaker participant as recorded voice messages during the online meeting;

adding a unique tag to each recorded voice message of the recorded voice messages;

transmitting the recorded voice messages, with their respective unique tags, to respective computing devices of listener participants of the online meeting;

receiving, at the computing device of the speaker participant, one or more response tags from the respective computing devices of the listener participants, wherein a response tag comprises a unique tag of a recorded voice message, of the transmitted recorded voice messages, received at a computing device of a listener participant and a marker which identifies the computing device of the listener participant from which the response tag is sent;

based on the received response tags, identifying details of one or more transmitted recorded voice messages missed by one or more of the respective computing devices of the listener participants, wherein the details identify those respective computing devices of the listener participants having missed recorded voice messages; and notifying identified respective computing devices of the listener participants of their respectively missed recorded voice messages.

14. The computer program product of claim 13, wherein recording utterances of the speaker participant as recorded voice messages during the online meeting comprises:

utilizing sentence boundary detection techniques to parse language of the speaker participant spoken during the online meeting into sentence-like units; and recording each sentence-like unit as an individual audio clip.

15. The computer program product of claim 13, wherein a unique tag of a recorded voice message comprises a timestamp at which the voice message was recorded.

16. The computer program product of claim 13, wherein identifying the details of one or more transmitted recorded voice messages missed by one or more of the respective computing devices of the listener participants comprises identifying a lack of receipt of one or more response tags respectively associated with the recorded voice messages transmitted to the respective computing devices of the listener participants.

17. The computer program product of claim 13, further comprising:

in response to notifying an identified computing device of a listener participant of its missed recorded voice messages, receiving a request from the identified computing device of the listener participant for re-transmitting of a missed recorded voice message; and re-transmitting, via the computing device of the speaker participant, data of the missed recorded voice message to the identified computing device of the listener participant.

* * * * *